United States Patent
Lin

(10) Patent No.: US 10,790,961 B2
(45) Date of Patent: Sep. 29, 2020

(54) CIPHERTEXT PREPROCESSING AND ACQUISITION

(71) Applicant: Alibaba Group Holding Limited, George Town (KY)

(72) Inventor: Wenzhen Lin, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/777,451

(22) Filed: Jan. 30, 2020

(65) Prior Publication Data

US 2020/0244436 A1    Jul. 30, 2020

Related U.S. Application Data

(63) Continuation of application No. PCT/CN2020/071460, filed on Jan. 10, 2020.

(30) Foreign Application Priority Data

Jul. 31, 2019    (CN) .......................... 2019 1 0699751

(51) Int. Cl.
*H04L 9/00* (2006.01)

(52) U.S. Cl.
CPC .......... *H04L 9/008* (2013.01); *H04L 2209/08* (2013.01)

(58) Field of Classification Search
CPC .................... H04L 9/008; H04L 2209/08
See application file for complete search history.

(56) References Cited

U.S. PATENT DOCUMENTS

| 10,097,522 B2 * | 10/2018 | Philipp ............... H04L 67/1097 |
| 2015/0213079 A1 * | 7/2015 | Shukla ................... G16B 50/00 707/687 |

(Continued)

FOREIGN PATENT DOCUMENTS

| CN | 103107889 | 5/2013 |
| CN | 104732159 | 6/2015 |

(Continued)

OTHER PUBLICATIONS

Kaaniche et al.; "Cooperative Set Homomorphic Proofs for Data Possession Checking in Clouds", Aug. 2015, Journal of Latex Class Files, vol. 14, No. 8, pp. 1-16 (Year: 2015).*

(Continued)

*Primary Examiner* — Matthew Smithers
(74) *Attorney, Agent, or Firm* — Fish & Richardson P.C.

(57) ABSTRACT

A computer-implemented method includes: obtaining, by a data party, a piece of plaintext to be encrypted; generating a ciphertext file including multiple pieces of ciphertext, each piece of ciphertext being derived from a homomorphic encryption algorithm executed on the piece of plaintext; adding a first file identifier of the ciphertext file to a file identifier set corresponding to the piece of plaintext; and in response to a piece of ciphertext derived from the piece of plaintext being needed for a cooperative calculation in which the data party is participating: obtaining the first file identifier from the file identifier set corresponding to the piece of plaintext, reading a first piece of ciphertext from the ciphertext file identified by the first file identifier, and sending the first piece of ciphertext to a partner participating in the cooperative calculation.

21 Claims, 5 Drawing Sheets

(56) References Cited

U.S. PATENT DOCUMENTS

| | | | |
|---|---|---|---|
| 2016/0191233 A1* | 6/2016 | Loftus | G06F 21/602 |
| | | | 713/189 |
| 2016/0261404 A1* | 9/2016 | Ford | H04L 67/104 |
| 2017/0177899 A1* | 6/2017 | Ng | G06F 21/6227 |
| 2017/0242961 A1* | 8/2017 | Shukla | G06F 21/53 |
| 2017/0277906 A1* | 9/2017 | Cannenisch; Jan L | |
| | | | G06F 21/6254 |
| 2018/0131512 A1* | 5/2018 | Gajek | H04L 9/008 |
| 2018/0183571 A1* | 6/2018 | Gajek | H04L 9/008 |
| 2019/0215160 A1 | 7/2019 | Lasko et al. | |
| 2019/0372754 A1* | 12/2019 | Gou | G06F 17/153 |
| 2019/0372760 A1* | 12/2019 | Zheng | H04L 9/085 |
| 2019/0394019 A1* | 12/2019 | Gao | H04L 9/30 |
| 2020/0034550 A1* | 1/2020 | Kim | H04L 9/3242 |
| 2020/0058022 A1* | 2/2020 | Ma | H04L 9/3239 |
| 2020/0073560 A1* | 3/2020 | Adanve | G06F 3/067 |
| 2020/0074548 A1* | 3/2020 | Aidoo | G06Q 40/04 |

FOREIGN PATENT DOCUMENTS

| | | |
|---|---|---|
| CN | 105320896 | 2/2016 |
| CN | 106534313 | 3/2017 |
| CN | 106571905 | 4/2017 |
| CN | 107124616 | 9/2017 |
| CN | 107528917 | 12/2017 |
| CN | 109644431 | 4/2019 |
| CN | 109831297 | 5/2019 |
| CN | 110391895 | 10/2019 |
| EP | 1054527 | 11/2000 |

OTHER PUBLICATIONS

Lopez-Alt et al.; "On-the-Fly Multiparty Computation on the Cloud via Multikey Fully Homomorphic Encryption", 2012, ACM, pp. 1219-1234. (Year: 2012).*

Application No. CN 201711350921, First Office Action Translated, dated Oct. 10, 2019, pp. 1-6. (Year: 2019).*

Application No. CN 201710377181, First Office Action Translated, dated Sep. 26, 2019, pp. 1-7. (Year: 2019).*

Application No. CN 201710377165, First Office Action Translated, dated Oct. 28, 2019, pp. 1-5. (Year: 2019).*

Application No. CN 201610943789, First Office Action Translated, dated Jan. 28, 2019, pp. 1-4. (Year: 2019).*

Application No. CN 201710822232, First Office Action Translated, dated Nov. 25, 2019, pp. 1-6. (Year: 2019).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2020/071460, dated Apr. 26, 2020, 19 pages (with machine translation).

\* cited by examiner

CIPHERTEXT PREPROCESSING AND ACQUISITION

CROSS-REFERENCE TO RELATED APPLICATIONS

This application is a continuation of PCT Application No. PCT/CN2020/071460, filed on Jan. 10, 2020, which claims priority to Chinese Patent Application No. 201910699751.X, filed on Jul. 31, 2019, and each application is hereby incorporated by reference in its entirety.

TECHNICAL FIELD

Implementations of the present specification relate to the field of computer technologies, and in particular to data preprocessing method and apparatus, ciphertext data acquisition method and apparatus, and an electronic device.

BACKGROUND

In security-preserving data cooperation scenarios, multiple data parties can perform cooperative calculation based on their own data. For the sake of protecting data privacy, the multiple parties cannot leak their own data in the cooperative calculation process. In the related technology, a feasible method is that one party performs homomorphic encryption on its own data by using a homomorphic encryption algorithm, and sends a piece of encrypted ciphertext to other parties participating in cooperative calculation, so that the other parties perform calculation based on the piece of ciphertext. However, because the homomorphic encryption process consumes a relatively long time, efficiency of cooperative calculation is low.

SUMMARY

An objective of implementations of the present specification is to provide data preprocessing method and apparatus, ciphertext data acquisition method and apparatus, and an electronic device, to improve efficiency of cooperative calculation.

To achieve this objective, one or more implementations of the present specification provide the following technical solutions:

According to a first aspect of one or more implementations of the present specification, a data preprocessing method is provided, including the following: generating multiple ciphertext files based on plaintexts, where each ciphertext file includes multiple pieces of ciphertexts that are generated as a result of running a homomorphic encryption algorithm on a same piece of plaintext; and adding respective file identifiers of the multiple ciphertext files to a file identifier set.

According to a second aspect of one or more implementations of the present specification, a ciphertext data acquisition method is provided, including the following: obtaining at least one piece of plaintext to be encrypted; obtaining a file identifier from a file identifier set corresponding to the piece of plaintext; and reading a piece of ciphertext from a ciphertext file identified by the file identifier, where the ciphertext file includes multiple pieces of ciphertexts that are generated as a result of running a homomorphic encryption algorithm on the same piece of plaintext.

According to a third aspect of one or more implementations of the present specification, a data preprocessing apparatus is provided, including the following: a generation unit, configured to generate multiple ciphertext files based on plaintexts, where each ciphertext file includes multiple pieces of ciphertexts that are generated as a result of running a homomorphic encryption algorithm on the same piece of plaintext; and an adding unit, configured to add file identifiers of the ciphertext files to a file identifier set.

According to a fourth aspect of one or more implementations of the present specification, an electronic device is provided, including the following: a memory, configured to store a computer instruction; and a processor, configured to execute the computer instruction to implement the method step according to the first aspect.

According to a fifth aspect of one or more implementations of the present specification, a ciphertext data acquisition apparatus is provided, including the following: a first acquisition unit, configured to obtain at least one piece of plaintext to be encrypted; a second acquisition unit, configured to obtain a file identifier from a file identifier set corresponding to the piece of plaintext; and a reading unit, configured to read a piece of ciphertext from a ciphertext file identified by the file identifier, where the ciphertext file includes multiple pieces of ciphertexts that are generated as a result of running a homomorphic encryption algorithm on the same piece of plaintext.

According to a sixth aspect of one or more implementations of the present specification, an electronic device is provided, including the following: a memory, configured to store a computer instruction; and a processor, configured to execute the computer instruction to implement the method step according to the second aspect.

As can be seen from the technical solutions provided in the previous implementations of the present specification, in the implementations of the present specification, the data party can obtain at least one piece of plaintext to be encrypted; can obtain the file identifier from the file identifier set corresponding to the piece of plaintext; and can read the piece of ciphertext from the ciphertext file identified by the file identifier, where the ciphertext file includes multiple pieces of ciphertexts that are generated as a result of running the homomorphic encryption algorithm on the same piece of plaintext. As such, during the cooperative calculation, when needing to obtain the piece of homomorphic ciphertext corresponding to the piece of plaintext, the data party can read the piece of pre-calculated homomorphic ciphertext from the ciphertext file, avoiding real-time encryption of the piece of plaintext in the cooperative calculation process, and improving the efficiency of cooperative calculation.

BRIEF DESCRIPTION OF DRAWINGS

To describe technical solutions in the implementations of the present specification or in the existing technology more clearly, the following briefly describes the accompanying drawings needed for describing the implementations or the existing technology. Clearly, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

The following clearly describes the technical solutions in the implementations of the present specification with reference to the accompanying drawings in the implementations of the present specification. Clearly, the described implementations are merely some but not all of the implementations of the present specification. All other implementations obtained by a person of ordinary skill in the art based on the implementations of the present specification without creative efforts shall fall within the protection scope of the present specification.

Homomorphic encryption is a form of encryption that allows computation on ciphertexts, generating an encrypted result which, when decrypted, matches the result of the operations as if they had been performed on the plaintext. Algorithms for implementing homomorphic encryption can include the Paillier algorithm, the Okamoto-Uchiyama algorithm, the Damgard-Jurik algorithm, etc. The homomorphic encryption algorithm features randomness. Multiple pieces of different ciphertexts can be generated when running a homomorphic encryption algorithm to encrypt a same plaintext multiple times.

In security-preserving data cooperation scenarios, multiple data parties can perform cooperative calculation based on their own data. For the sake of protecting data privacy, the multiple data parties cannot leak their own data in the cooperative calculation process. The security-preserving data cooperation scenarios can include, for example, a cooperative security modeling scenario, and multiple data parties can cooperatively train a data processing model based on their own data. The data parties may involve respective electronic devices. The electronic devices can include a personal computer, a server, a handheld device, a portable device, a tablet device, and a multi-processor apparatus, or can further include a cluster of any apparatuses or devices described above, etc. Therefore, during the cooperative calculation, one party can send a piece of ciphertext of the piece of plaintext after homomorphic encryption to other parties participating in cooperative calculation, so that the other parties perform calculation based on the piece of ciphertext. If the time-consuming homomorphic encryption process is preprocessed before cooperative calculation, computation, the homomorphic encryption process in the cooperative calculation process can be converted into a ciphertext data reading process, thereby shortening the time consumed by the homomorphic encryption process and improving efficiency of the cooperative calculation.

The present specification provides an implementation of a data preprocessing method. The present implementation can be applied to a data party participating in cooperative calculation. The method steps in the present implementation can be performed before the cooperative calculation phase.

Figure 1:
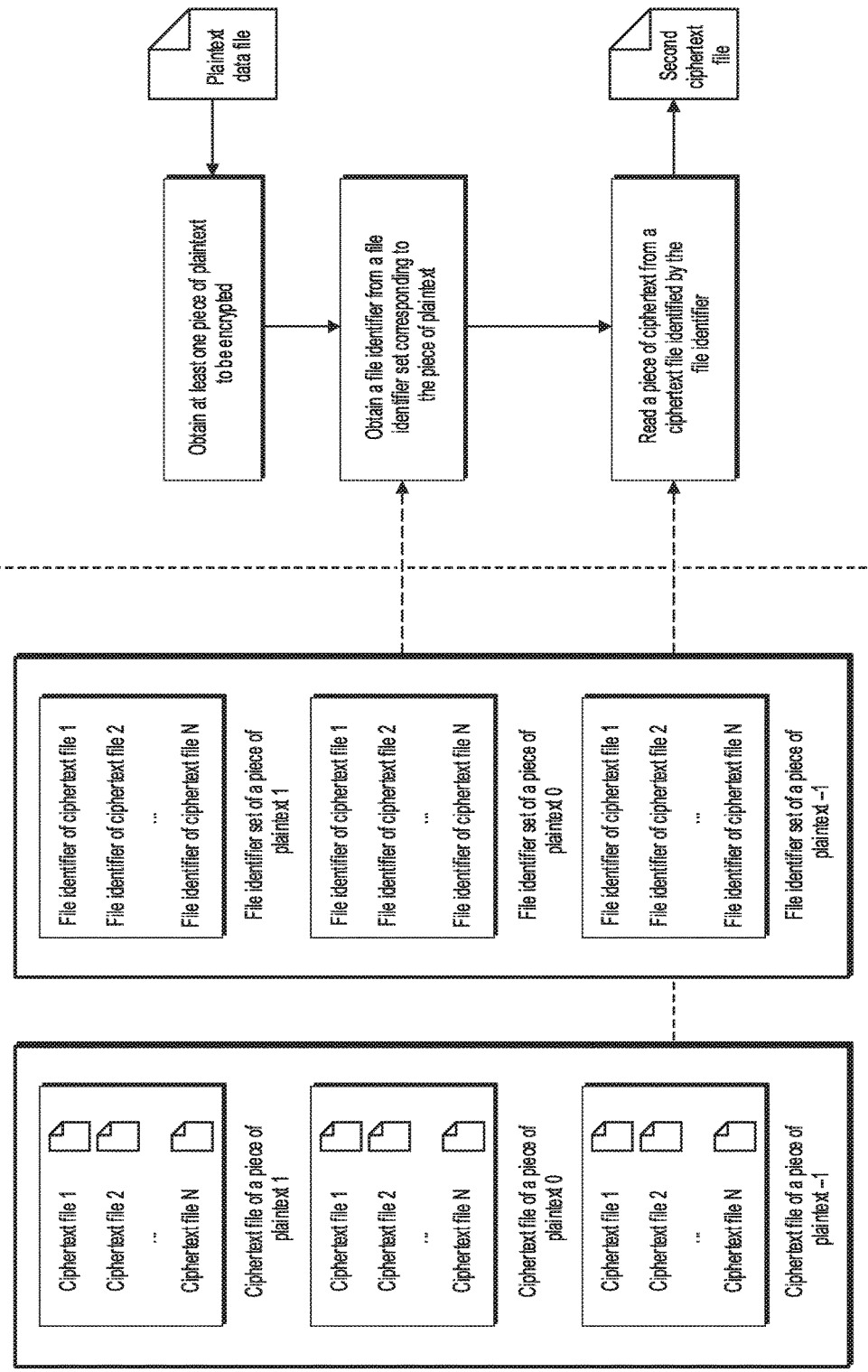
FIG. 1 is a schematic diagram illustrating a ciphertext data acquisition method, according to an implementation of the present specification.
Figure 2:
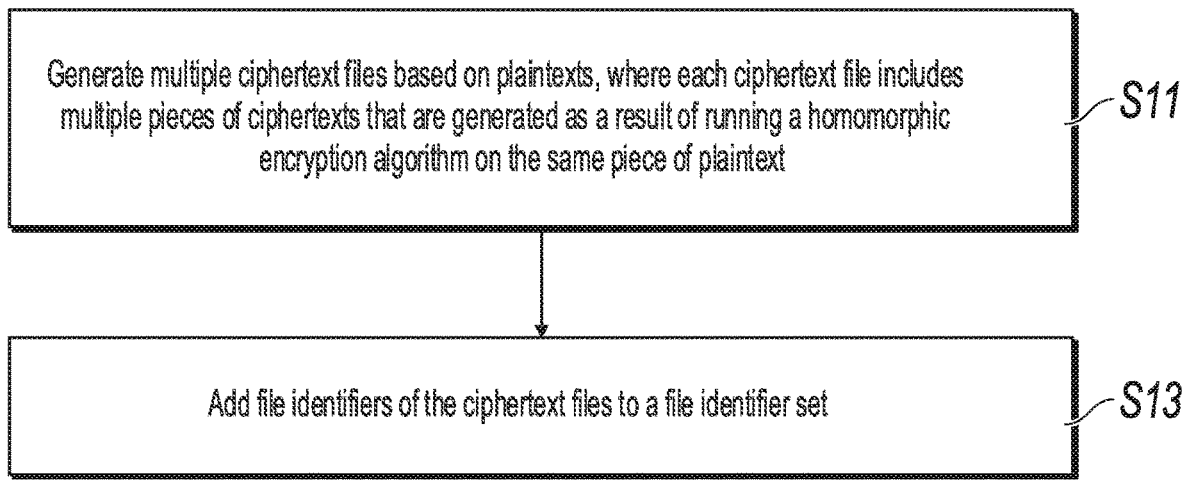
FIG. 2 is a flowchart illustrating a data preprocessing method, according to an implementation of the present specification.

References are made to FIG. 1 and FIG. 2. The implementation can include the following steps.

S11: Generate multiple ciphertext files based on plaintexts, where each ciphertext file includes multiple pieces of ciphertexts that are generated as a result of running a homomorphic encryption algorithm on the same piece of plaintext.

In some implementations, the piece of plaintext can be data held by the data party for participating in cooperative calculation. The piece of plaintext can be, for example, original business data (such as a user's savings amount, loan amount, etc.), or can be intermediate data generated during cooperative calculation. Because values of some enumerable pieces of plaintexts participating in cooperative calculation are usually taken from several fixed values (such as 1, 0, −1, etc.), the data party can generate multiple ciphertext files based on each piece of plaintext in advance.

In some implementations, the ciphertext file can include multiple pieces of ciphertexts that are generated as a result of running a homomorphic encryption algorithm on the same piece of plaintext. Specifically, the data party can use the homomorphic encryption algorithm to encrypt each piece of plaintext multiple times to obtain multiple pieces of different ciphertexts; and can generate multiple ciphertext files corresponding to the piece of plaintext based on the multiple pieces of different ciphertexts. Each ciphertext file can include multiple pieces of ciphertexts, and the ciphertext files can include same or different pieces of ciphertexts. In practice, the data party can have an encryption public/private key pair. The encryption public/private key pair can include a homomorphic encryption public key and a homomorphic encryption private key that are associated with each other. The homomorphic encryption public key can be used to encrypt a piece of plaintext, and the homomorphic encryption private key can be used to decrypt a piece of encrypted ciphertext. As such, the data party can use the homomorphic encryption public key to encrypt the piece of plaintext. Specifically, the data party can encrypt multiple pieces of plaintexts by using the same homomorphic encryption public key, or by using different homomorphic encryption public keys.

For example, the data party can use the homomorphic encryption algorithm to encrypt pieces of plaintexts 1 in batches to obtain N×5000 pieces of ciphertexts; and can generate N ciphertext files corresponding to the pieces of plaintexts 1 based on the N×5000 pieces of ciphertexts. Each ciphertext file, in turn, can include 5,000 pieces of ciphertexts.

The data party can also use the homomorphic encryption algorithm to encrypt pieces of plaintexts 0 in batches to obtain N×5000 pieces of ciphertexts; and can generate N ciphertext files corresponding to the pieces of plaintexts 0 based on the N×5000 pieces of ciphertexts. Each ciphertext file, in turn, can include 5,000 pieces of ciphertexts.

The data party can also use the homomorphic encryption algorithm to encrypt pieces of plaintexts −1 in batches to obtain N×5000 pieces of ciphertexts; and can generate N ciphertext files corresponding to the pieces of plaintexts 1 based on the N×5000 pieces of ciphertexts. Each ciphertext file can include 5,000 pieces of ciphertexts.

In some implementations, the data party can also store the ciphertext files generated in batches, for example, store the ciphertext files generated in batches in a memory. The memory can include a random access memory, a nonvolatile memory, etc. The nonvolatile memory can include a disk storage device, a solid-state storage device, a flash memory device, a network attached storage, etc.

S13: Add file identifiers of the ciphertext files to a file identifier set.

In some implementations, the file identifier set can be implemented in a form of a data table, a linear table, a queue, a stack, a graph, or the like. The file identifier set can include at least one file identifier. The file identifier can be used to identify a ciphertext file, and can be, for example, a filename or number of the ciphertext file. The file identifier set can be specifically used as an index, so that a file identifier of a ciphertext file can be obtained from the file identifier set when needed.

In some implementations, after S12, each piece of plaintext can correspond to multiple ciphertext files. The data party can add file identifiers of ciphertext files corresponding to each piece of plaintext to a file identifier set corresponding to the piece of plaintext.

Referring back to the previous example, the data party can add the file identifiers of the N ciphertext files corresponding to the pieces of plaintexts 1 to a file identifier queue corresponding to the pieces of plaintexts 1; can add the file identifiers of the N ciphertext files corresponding to the pieces of plaintexts 0 to a file identifier queue corresponding to the pieces of plaintexts 0; and can add the file identifiers of the N ciphertext files corresponding to pieces of plaintexts −1 to a file identifier queue corresponding to the pieces of plaintexts −1.

In the present implementation, the data party can multiple ciphertext files based on the plaintexts before cooperative calculation; and can add file identifiers of the ciphertext files to the file identifier set, so that pieces of ciphertexts corresponding to the pieces of plaintexts is obtained by reading the ciphertext files during cooperative calculation.

Figure 3:
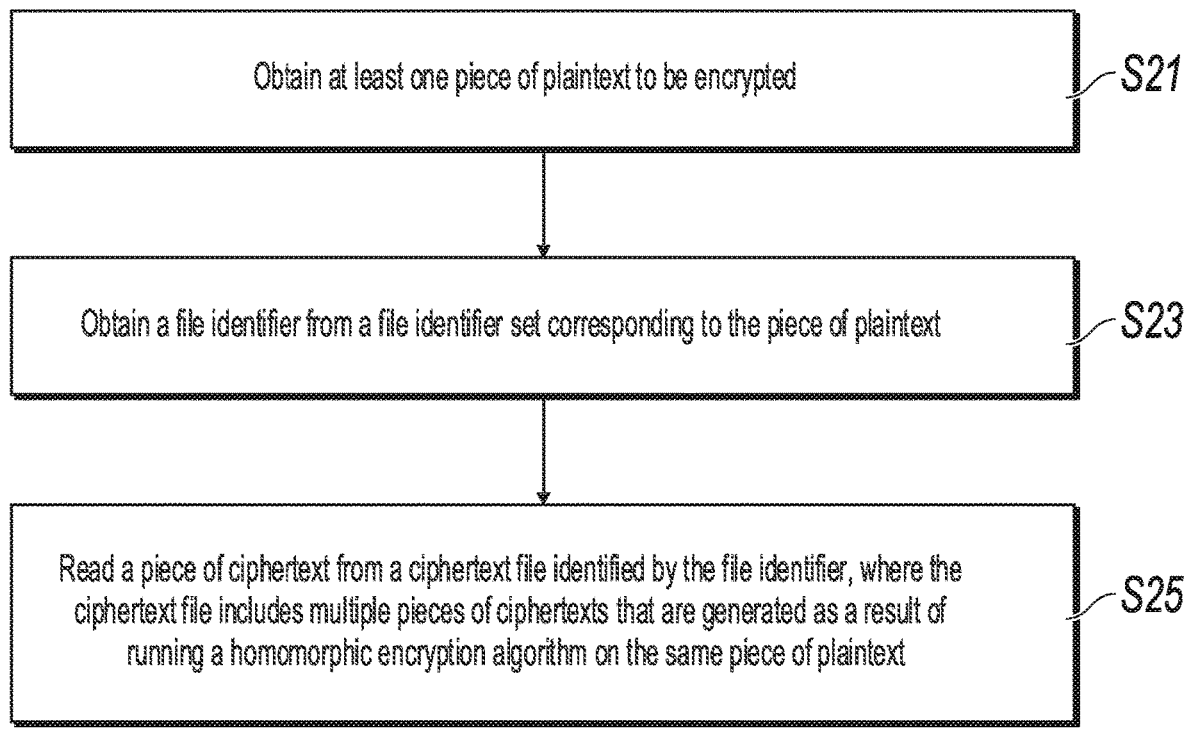
FIG. 3 is a flowchart illustrating a ciphertext data acquisition method, according to an implementation of the present specification.

The present specification further provides an implementation of a ciphertext data acquisition method. The present implementation can be applied to data party participating in cooperative calculation. The method steps in the present implementation can be performed at the cooperative calculation phase. References are made to FIG. 1 and FIG. 3. The implementation can include the following steps.

S21: Obtain at least one piece of plaintext to be encrypted.

In some implementations, the piece of plaintext can be data held by the data party for participating in cooperative calculation. The piece of plaintext can be, for example, original business data, or can be intermediate data generated during cooperative calculation. There may be one or more pieces of plaintexts obtained by the data party. When there are multiple obtained pieces of plaintexts, various pieces of plaintexts can be totally different (such as 1, 0, −1, etc.), partially identical (such as 0, 0, 1, etc.), or completely the same (such as 1, 1, 1, etc.).

In some implementations, the data party can read at least one piece of plaintext to be encrypted from a plaintext file. The plaintext file can include at least one piece of plaintext to be encrypted. The plaintext file can be generated by the data party or by another device. For example, the another device can read at least one piece of plaintext to be encrypted from the database; can generate the plaintext file based on the read piece of plaintext; and can send the plaintext file to the data party. The data party can receive the plaintext file.

S23: Obtain a file identifier from a file identifier set corresponding to the piece of plaintext.

In some implementations, each piece of plaintext can correspond to a file identifier set. The file identifier set can be implemented in a form of a data table, a linear table, a queue, a stack, a graph, or the like. The file identifier set can include at least one file identifier. The file identifier can be used to identify a ciphertext file (hereinafter referred to as a first ciphertext file), and can be, for example, a filename or number of the first ciphertext file. The first ciphertext file can be generated by the data party in advance. The first ciphertext file can include multiple pieces of different ciphertexts that are generated as a result of running a homomorphic encryption algorithm on the same piece of plaintext.

In some implementations, the data party can obtain the file identifier set corresponding to the piece of plaintext, and can obtain a file identifier from the file identifier set. The data party can obtain one or more file identifiers from the file identifier set. Depending on different implementations of the file identifier set, the data party can obtain the file identifier in different ways. For example, the file identifier set can be implemented in a form of a queue, and in such case, the data party can obtain a file identifier with the earliest queue entry time. For example, the file identifier set can also be implemented in a form of a data table, and in such case, the data party can randomly select a file identifier from the data table.

For example, the data party can obtain pieces of plaintexts 1, 0, and −1 to be encrypted; can obtain a file identifier from a file identifier set corresponding to a piece of plaintext 1; can obtain a file identifier from a file identifier set corresponding to a piece of plaintext 0; and can obtain a file identifier from a file identifier set corresponding to a piece of plaintext −1.

For another example, the data party can obtain pieces of plaintexts 0, 0, and 1 to be encrypted; can obtain a file identifier from a file identifier set corresponding to a piece of plaintext 0; and can obtain a file identifier from a file identifier set corresponding to a piece of plaintext 1.

For another example, the data party can obtain pieces of plaintexts 1, 1, and 1 to be encrypted; and can obtain a file identifier from a file identifier set corresponding to a piece of plaintext 1.

S25: Read a piece of ciphertext from a ciphertext file identified by the file identifier, where the ciphertext file includes multiple pieces of ciphertexts that are generated as a result of running a homomorphic encryption algorithm on the piece of plaintext.

In some implementations, the data party can read one or more pieces of ciphertexts from the first ciphertext file identified by each file identifier to obtain a piece of ciphertext corresponding to the piece of plaintext. In practice, the data party can read the first ciphertext file identified by the file identifier from the memory, and can read one or more pieces of ciphertexts from the first ciphertext file.

For example, the data party can obtain pieces of plaintexts 1, 0, and −1 to be encrypted; can obtain a file identifier from a file identifier set corresponding to a piece of plaintext 1, and can read a piece of ciphertext from a first ciphertext file identified by the file identifier to obtain a piece of ciphertext corresponding to a piece of plaintext 1; can obtain a file identifier from a file identifier set corresponding to a piece of plaintext 0, and can read a piece of ciphertext from a first ciphertext file identified by the file identifier to obtain a piece of ciphertext corresponding to a piece of plaintext 0; and can obtain a file identifier from a file identifier set corresponding to a piece of plaintext −1, and can read a piece of ciphertext from a first ciphertext file identified by the file identifier to obtain a piece of ciphertext corresponding to a piece of plaintext −1.

For another example, the data party can obtain pieces of plaintexts 0, 0, and 1 to be encrypted; can obtain a file identifier from a file identifier set corresponding to a piece of plaintext 0, and can read two pieces of ciphertexts from a first ciphertext file identified by the file identifier to obtain a piece of ciphertext corresponding to a piece of plaintext 0 and a piece of plaintext 0; and can obtain a file identifier from a file identifier set corresponding to a piece of plaintext 1, and can read a piece of ciphertext from a first ciphertext file identified by the file identifier to obtain a piece of ciphertext corresponding to a piece of plaintext 1.

For another example, the data party can obtain pieces of plaintexts 1, 1, and 1 to be encrypted; and can obtain a file identifier from a file identifier set corresponding to a piece of plaintext 1, and can read three pieces of ciphertexts from a first ciphertext file identified by the file identifier to obtain pieces of ciphertexts corresponding to pieces of plaintexts 1, 1, and 1.

In some implementations, after S23, the data party can further delete the obtained file identifier from the file identifier set corresponding to the piece of plaintext, so as to avoid double acquisition of the file identifier.

In some implementations, after S25, the data party can further delete the first ciphertext file identified by the obtained file identifier, so as to avoid double reading of the first ciphertext file.

Further, the data party can generate a new first ciphertext file of the piece of plaintext, and can add a file identifier of the new first ciphertext file to the file identifier set corresponding to the piece of plaintext. Specifically, the data party can generate a new first ciphertext file for all the pieces of plaintexts obtained in S21, or can generate a new first ciphertext file for some of the pieces of plaintexts obtained in S21. The data party can generate one or more new first ciphertext files for each piece of plaintext. For a specific process, references can be made to the previous data preprocessing implementation, and details are omitted here for simplicity.

For example, the data party can obtain pieces of plaintexts 1, 0, and −1 to be encrypted. The data party can obtain a file identifier from a file identifier set corresponding to a piece of plaintext 1; can read a piece of ciphertext from a first ciphertext file identified by the file identifier to obtain a piece of ciphertext corresponding to a piece of plaintext 1; can delete the file identifier from the file identifier set corresponding to a piece of plaintext 1; and can delete the first ciphertext file identified by the file identifier. The data party can also obtain a file identifier from a file identifier set corresponding to a piece of plaintext 0; can read a piece of ciphertext from a first ciphertext file identified by the file identifier to obtain a piece of ciphertext corresponding to a piece of plaintext 0; can delete the file identifier from the file identifier set corresponding to a piece of plaintext 0; and can delete the first ciphertext file identified by the file identifier. The data party can also obtain a file identifier from a file identifier set corresponding to a piece of plaintext −1; can read a piece of ciphertext from a first ciphertext file identified by the file identifier to obtain a piece of ciphertext corresponding to a piece of plaintext −1; can delete the file identifier from the file identifier set corresponding to a piece of plaintext −1; and can delete the first ciphertext file identified by the file identifier.

The data party can generate a new first ciphertext file of the piece of plaintext 1 and can add a file identifier of the new first ciphertext file to a file identifier set corresponding to the piece of plaintext 1; can generate a new first ciphertext file of the piece of plaintext 0 and can add a file identifier of the new first ciphertext file to a file identifier set corresponding to the piece of plaintext 0; and can generate a new first ciphertext file of the piece of plaintext −1 and can add a file identifier of the new first ciphertext file to a file identifier set corresponding to the piece of plaintext −1.

For another example, the data party can obtain pieces of plaintexts 0, 0, and 1 to be encrypted. The data party can obtain a file identifier from a file identifier set corresponding to a piece of plaintext 0; can read two pieces of ciphertexts from a first ciphertext file identified by the file identifier to obtain a piece of ciphertext corresponding to a piece of plaintext 0 and a piece of plaintext 0; can delete the file identifier from the file identifier set corresponding to the piece of plaintext 0; and can delete the first ciphertext file identified by the file identifier. The data party can also obtain a file identifier from a file identifier set corresponding to the piece of plaintext 1; can read a piece of ciphertext from a first ciphertext file identified by the file identifier to obtain a piece of ciphertext corresponding to the piece of plaintext 1; can delete the file identifier from the file identifier set corresponding to the piece of plaintext 1; and can delete the first ciphertext file identified by the file identifier.

The data party can generate a new first ciphertext file of the piece of plaintext 0 and can add a file identifier of the new first ciphertext file to a file identifier set corresponding to the piece of plaintext 0; and can generate a new first ciphertext file of the piece of plaintext 1 and can add a file identifier of the new first ciphertext file to a file identifier set corresponding to the piece of plaintext 1.

For another example, the data party can obtain pieces of plaintexts 1, 1, and 1 to be encrypted; can obtain a file identifier from a file identifier set corresponding to a piece of plaintext 1; can read three pieces of ciphertexts from a first ciphertext file identified by the file identifier to obtain pieces of ciphertexts corresponding to pieces of plaintexts 1, 1, and 1; can delete the file identifier from the file identifier set corresponding to a piece of plaintext 1; and can delete the first ciphertext file identified by the file identifier.

The data party can generate a new first ciphertext file of the piece of plaintext 1, and can add a file identifier of the new first ciphertext file to the file identifier set corresponding to the piece of plaintext 1.

In some implementations, the data party can also send the read a piece of ciphertext to a partner so that the partner performs calculation based on the piece of ciphertext. The partner can be understood as a data party that performs cooperative calculation with the data party, such as a data party that performs cooperative security modeling with the data party. The data party can directly send the read a piece of ciphertext. Alternatively, data party can further write the piece of read ciphertext into a ciphertext file (hereinafter referred to as a second ciphertext file); and can send the second ciphertext file to the partner.

In the present implementation, the data party can obtain at least one piece of plaintext to be encrypted; can obtain the file identifier from the file identifier set corresponding to the piece of plaintext; and can read the piece of ciphertext from the ciphertext file identified by the file identifier, where the ciphertext file includes multiple pieces of ciphertexts that are generated as a result of running the homomorphic encryption algorithm on the piece of plaintext. As such, during the cooperative calculation, when needing to obtain the piece of homomorphic ciphertext corresponding to the piece of plaintext, the data party can read the piece of pre-calculated homomorphic ciphertext from the ciphertext file, avoiding real-time encryption of the piece of plaintext in the cooperative calculation process, and improving the efficiency of cooperative calculation.

Figure 4:
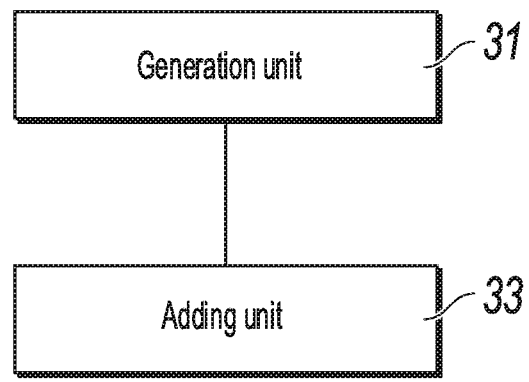
FIG. 4 is a schematic diagram illustrating a functional structure of a data preprocessing apparatus, according to an implementation of the present specification.

References are made to FIG. 4. Based on the same inventive concept, the present specification further provides an implementation of a data preprocessing apparatus. The present implementation can be applied to a data party participating in cooperative calculation, and can specifically include the following units: a generation unit 31, configured to generate multiple ciphertext files based on plaintexts, where each ciphertext file includes multiple pieces of ciphertexts that are generated as a result of running a homomorphic encryption algorithm on the same piece of plaintext; and an adding unit 33, configured to add file identifiers of the ciphertext files to a file identifier set.

Figure 5:
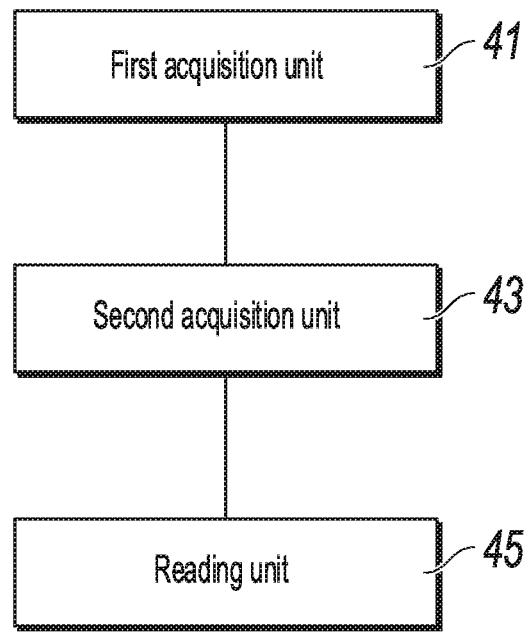
FIG. 5 is a schematic diagram illustrating a functional structure of a ciphertext data acquisition apparatus, according to an implementation of the present specification.

References are made to FIG. 5. Based on the same inventive concept, the present specification further provides an implementation of a ciphertext data acquisition apparatus. The present implementation can be applied to a data party participating in cooperative calculation, and can specifically include the following units: a first acquisition unit 41, configured to obtain at least one piece of plaintext to be encrypted; a second acquisition unit 43, configured to obtain a file identifier from a file identifier set corresponding to the piece of plaintext; and a reading unit 45, configured to read a piece of ciphertext from a ciphertext file identified by the file identifier, where the ciphertext file includes multiple pieces of ciphertexts that are generated as a result of running a homomorphic encryption algorithm on the same piece of plaintext.

Figure 6:
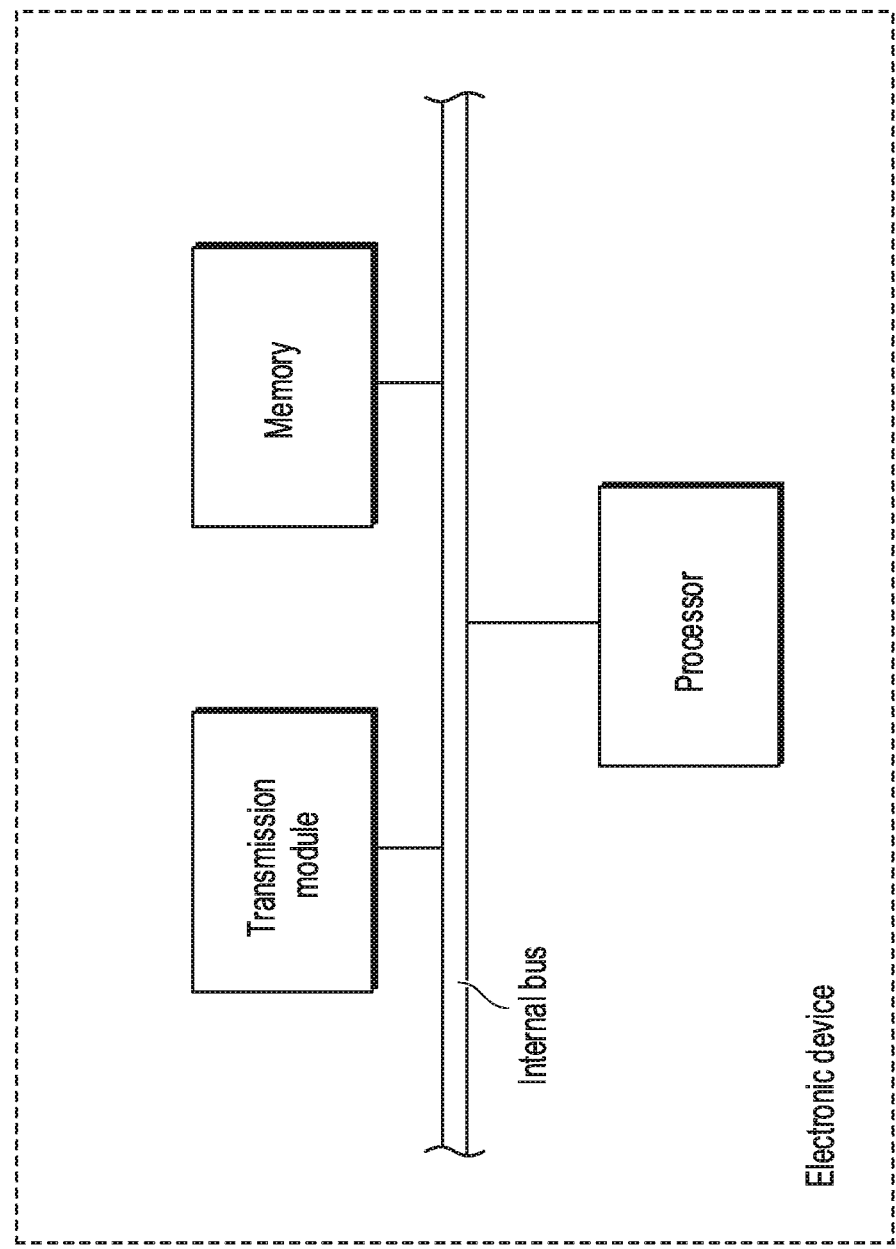
FIG. 6 is a schematic diagram illustrating a functional structure of an electronic device, according to an implementation of the present specification.

The following describes an implementation of an electronic device in the present specification. FIG. 6 is a schematic diagram of a hardware structure of an electronic device in the implementation. As shown in FIG. 6, the electronic device can include one or more processors (only one processor is shown in the figure), one or more memories, and one or more transmission modules. Certainly, a person of ordinary skill in the art can understand that the hardware structure shown in FIG. 6 is merely an example, and does not limit the hardware structure of the previous electronic device. In practice, the electronic device can further include more or less components or units than those shown in FIG. 6, or can have a configuration different from that shown in FIG. 6.

The memory can include a high-speed random access memory, or can further include non-volatile memories, such as one or more magnetic storage devices, flash memories, or other non-volatile solid-state memories. Certainly, the memory can further include a remotely disposed network memory. The remotely disposed network memory can be connected to the electronic device by using a network such as the Internet, an intranet, a local area network, or a mobile communications network. The memory can be configured to store a program instruction or module of application software, for example, at least one of a program instruction or module of the implementation corresponding to FIG. 2, or a program instruction or module of the implementation corresponding to FIG. 3 in the present specification.

The processor can be implemented in any suitable methods. For example, the processor can take the form of, for example, a microprocessor or processor, a computer readable medium storing computer readable program code (such as software or firmware) executable by the microprocessor or processor, a logic gate, a switch, an application specific integrated circuit (ASIC), a programmable logic controller, and an embedded microcontroller. The processor can read and execute the program instruction or module in the memory.

The transmission module can be configured to perform data transmission via a network such as the Internet, an intranet, a local area network, or a mobile communications network.

It is worthwhile to note that the implementations in the present specification are described in a progressive way. For same or similar parts of the implementations, references can be made to the implementations mutually. Each implementation focuses on a difference from other implementations. Especially, an apparatus implementation and an electronic device implementation are similar to a method implementation, and therefore are described briefly. For related parts, references can be made to the descriptions in the method implementation. In addition, it can be understood that, after reading the present specification document, a person skilled in the art can figure out any combination of some or all of the implementations enumerated in the present specification without creative efforts, and these combinations also fall within the disclosure and protection scopes of the present specification.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

The system, apparatus, module, or unit illustrated in the previous implementations can be implemented by using a computer chip or an entity, or can be implemented by using a product having a certain function. A typical implementation device is a computer. Specifically, the computer can be, for example, a personal computer, a laptop computer, a cellular phone, a camera phone, a smart phone, a personal digital assistant, a media player, a navigation device, an e-mail device, a game console, a tablet computer, a wearable device, or a combination of any of these devices.

It can be seen from the descriptions of the implementations that a person skilled in the art can clearly understand that the present specification can be implemented by using software and a necessary general hardware platform. Based on such an understanding, the technical solutions in the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (can be a personal computer, a server, or a network device) to perform the methods described in the implementations or in some parts of the implementations of the present specification.

The present specification can be applied to many general-purpose or dedicated computer system environments or configurations, for example, a personal computer, a server computer, a handheld device or a portable device, a tablet device, a multi-processor system, a microprocessor-based system, a set-top box, a programmable consumer electronic device, a network PC, a minicomputer, a mainframe computer, and a distributed computing environment including any one of the previous systems or devices.

The present specification can be described in the general context of computer-executable instructions, for example, a program module. Generally, the program module includes a routine, a program, an object, a component, a data structure, etc. executing a specific task or implementing a specific abstract data type. The present specification can alternatively be practiced in distributed computing environments in which tasks are performed by remote processing devices that are connected through a communications network. In a distributed computing environment, the program module can be located in both local and remote computer storage media including storage devices.

Although the present specification is described by using the implementations, a person of ordinary skill in the art knows that many variations of the present specification can be made without departing from the spirit of the present specification. It is expected that the appended claims include these variations without departing from the spirit of the present specification.

What is claimed is:

1. A computer-implemented method comprising:
    obtaining, by a data party, a piece of plaintext to be encrypted;
    generating a ciphertext file comprising multiple pieces of ciphertext, each piece of ciphertext being derived from a homomorphic encryption algorithm executed on the piece of plaintext;
    adding a first file identifier of the ciphertext file to a file identifier set corresponding to the piece of plaintext; and
    in response to a piece of ciphertext derived from the piece of plaintext being needed for a cooperative calculation in which the data party is participating:
        obtaining the first file identifier from the file identifier set corresponding to the piece of plaintext,
        reading a first piece of ciphertext from the ciphertext file identified by the first file identifier, and
        sending the first piece of ciphertext to a partner participating in the cooperative calculation.

2. The computer-implemented method of claim 1, wherein the file identifier set is implemented as a file identifier queue, and wherein obtaining the first file identifier comprises:
    obtaining, as the file identifier, a file identifier having an earliest queue entry time.

3. The computer-implemented method of claim 1, further comprising:

after obtaining the first file identifier, deleting the first file identifier from the file identifier set corresponding to the piece of plaintext.

4. The computer-implemented method of claim 1, further comprising:
    after sending the first piece of ciphertext, deleting the ciphertext file identified by the file identifier.

5. The computer-implemented method of claim 4, further comprising:
    generating multiple new pieces of ciphertext, each new piece of ciphertext derived from a second homomorphic encryption algorithm executed on the piece of plaintext;
    generating a new ciphertext file, wherein the new ciphertext file comprises the multiple new pieces of ciphertext; and
    adding a second file identifier to the file identifier set corresponding to the piece of plaintext, wherein the second file identifier is a file identifier of the new ciphertext file.

6. The computer-implemented method of claim 1, wherein the piece of plaintext comprises private data of the data party, and wherein the partner is to perform a calculation based on the first piece of ciphertext.

7. The computer-implemented method of claim 1, wherein the homomorphic encryption algorithm includes randomness.

8. A non-transitory, computer-readable medium storing one or more instructions executable by a computer system to perform operations comprising:
    obtaining, by a data party, a piece of plaintext to be encrypted;
    generating a ciphertext file comprising multiple pieces of ciphertext, each piece of ciphertext being derived from a homomorphic encryption algorithm executed on the piece of plaintext;
    adding a first file identifier of the ciphertext file to a file identifier set corresponding to the piece of plaintext; and
    in response to a piece of ciphertext derived from the piece of plaintext being needed for a cooperative calculation in which the data party is participating:
        obtaining the first file identifier from the file identifier set corresponding to the piece of plaintext,
        reading a first piece of ciphertext from the ciphertext file identified by the first file identifier, and
        sending the first piece of ciphertext to a partner participating in the cooperative calculation.

9. The non-transitory, computer-readable medium of claim 8, wherein the file identifier set is implemented as a file identifier queue, and wherein obtaining the first file identifier comprises:
    obtaining, as the file identifier, a file identifier having an earliest queue entry time.

10. The non-transitory, computer-readable medium of claim 8, wherein the operations further comprise:
    after obtaining the first file identifier, deleting the first file identifier from the file identifier set corresponding to the piece of plaintext.

11. The non-transitory, computer-readable medium of claim 8, wherein the operations further comprise:
    after sending the first piece of ciphertext, deleting the ciphertext file identified by the file identifier.

12. The non-transitory, computer-readable medium of claim 11, wherein the operations further comprise:

generating multiple new pieces of ciphertext, each new piece of ciphertext derived from a second homomorphic encryption algorithm executed on the piece of plaintext;

generating a new ciphertext file, wherein the new ciphertext file comprises the multiple new pieces of ciphertext; and adding a second file identifier to the file identifier set corresponding to the piece of plaintext, wherein the second file identifier is a file identifier of the new ciphertext file.

13. The non-transitory, computer-readable medium of claim 8, wherein the piece of plaintext comprises private data of the data party, and wherein the partner is to perform a calculation based on the first piece of ciphertext.

14. The non-transitory, computer-readable medium of claim 8, wherein the homomorphic encryption algorithm includes randomness.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
  obtaining, by a data party, a piece of plaintext to be encrypted;
  generating a ciphertext file comprising multiple pieces of ciphertext, each piece of ciphertext being derived from a homomorphic encryption algorithm executed on the piece of plaintext;
  adding a first file identifier of the ciphertext file to a file identifier set corresponding to the piece of plaintext; and
  in response to a piece of ciphertext derived from the piece of plaintext being needed for a cooperative calculation in which the data party is participating:
    obtaining the first file identifier from the file identifier set corresponding to the piece of plaintext,
    reading a first piece of ciphertext from the ciphertext file identified by the first file identifier, and
    sending the first piece of ciphertext to a partner participating in the cooperative calculation.

16. The computer-implemented system of claim 15, wherein the file identifier set is implemented as a file identifier queue, and wherein obtaining the first file identifier comprises:
  obtaining, as the file identifier, a file identifier having an earliest queue entry time.

17. The computer-implemented system of claim 15, wherein the operations further comprise:
  after obtaining the first file identifier, deleting the first file identifier from the file identifier set corresponding to the piece of plaintext.

18. The computer-implemented system of claim 15, wherein the operations further comprise:
  after sending the first piece of ciphertext, deleting the ciphertext file identified by the file identifier.

19. The computer-implemented system of claim 18, wherein the operations further comprise:
  generating multiple new pieces of ciphertext, each new piece of ciphertext derived from a second homomorphic encryption algorithm executed on the piece of plaintext;
  generating a new ciphertext file, wherein the new ciphertext file comprises the multiple new pieces of ciphertext; and
  adding a second file identifier to the file identifier set corresponding to the piece of plaintext, wherein the second file identifier is a file identifier of the new ciphertext file.

20. The computer-implemented system of claim 15, wherein the piece of plaintext comprises private data of the data party, and wherein the partner is to perform a calculation based on the first piece of ciphertext.

21. The computer-implemented system of claim 15, wherein the homomorphic encryption algorithm includes randomness.

* * * * *